United States Patent
James et al.

(10) Patent No.: US 9,470,867 B1
(45) Date of Patent: Oct. 18, 2016

(54) RETAINING ENCLOSURE FOR ABOVE-GROUND FIBER OPTIC/CABLE NETWORK TERMINAL

(71) Applicants: Chun-Nam Chan James, Richmond (CA); Hong Chen, Richmond (CA); Donovan Hammersley, White Rock (CA); Mahmud Harji, Surrey (CA)

(72) Inventors: Chun-Nam Chan James, Richmond (CA); Hong Chen, Richmond (CA); Donovan Hammersley, White Rock (CA); Mahmud Harji, Surrey (CA)

(73) Assignee: PRIMEX MANUFACTURING LTD., Langley, B.C. (CA)

( * ) Notice: Subject to any disclaimer, the term of this patent is extended or adjusted under 35 U.S.C. 154(b) by 0 days.

(21) Appl. No.: 14/756,752

(22) Filed: Oct. 8, 2015

(51) Int. Cl.
*G02B 6/44* (2006.01)

(52) U.S. Cl.
CPC .............. *G02B 6/445* (2013.01); *G02B 6/4447* (2013.01); *G02B 6/4471* (2013.01)

(58) Field of Classification Search
CPC .............................. G02B 6/445; G02B 6/4447
See application file for complete search history.

(56) References Cited

U.S. PATENT DOCUMENTS

| | | | | |
|---|---|---|---|---|
| 2006/0204198 | A1* | 9/2006 | Michiels | G02B 6/4446 385/135 |
| 2010/0054689 | A1* | 3/2010 | Mullaney | G02B 6/4477 385/135 |
| 2012/0230646 | A1* | 9/2012 | Thompson | G02B 6/4477 385/135 |
| 2013/0294733 | A1* | 11/2013 | Wright | G02B 6/2558 385/99 |
| 2015/0177472 | A1 | 6/2015 | Kowalczyk et al. | |
| 2015/0184777 | A1 | 7/2015 | Ray | |
| 2016/0003376 | A1* | 1/2016 | Sakmar | G02B 6/4471 248/63 |

\* cited by examiner

*Primary Examiner* — Jerry Rahll
(74) *Attorney, Agent, or Firm* — Frederick Kaufman Inc.

(57) ABSTRACT

The unit for retaining/securing a fiber optic cable comprises an enclosure including a tray having a back base plate, a top and a bottom sides and a unit for retaining/securing a fiber optic cable, disposed in an interior of the enclosure. The bottom side is provided with a pair of identical apertures. Each aperture resembles to a flat shovel having an upper rectangular shape continued by a circular sector; the aperture is so profiled as to engage alternatively a biting-retaining fixture for inserting a cable or an exit grommet for a leaving cable; the former is made of a rigid plastic, while the second—of a soft, elastic polymer. The unit for retaining/securing a fiber optic cable is actuated by a shifting lever, having a shape of an angled, cantilevered part with a longitudinal axis of symmetry bent generally at 90 degrees.

2 Claims, 11 Drawing Sheets

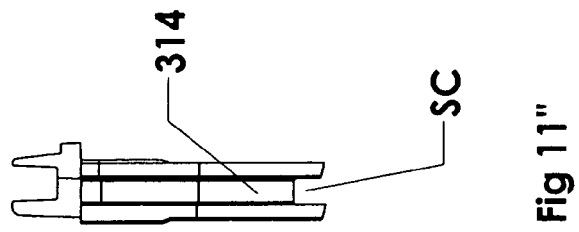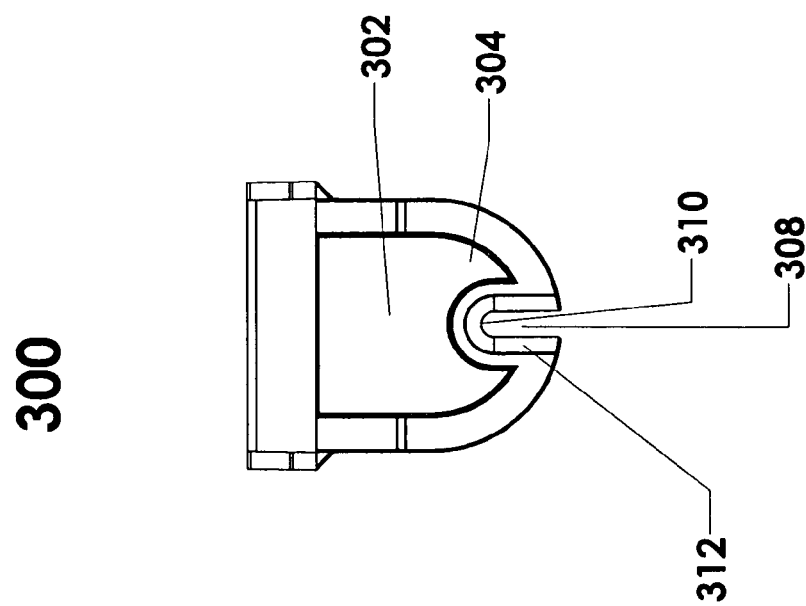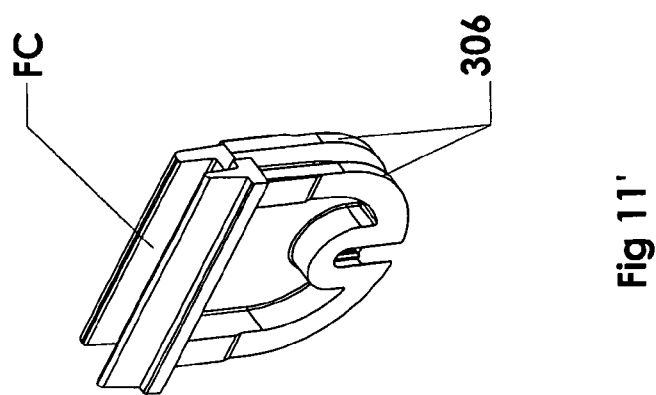

RETAINING ENCLOSURE FOR ABOVE-GROUND FIBER OPTIC/CABLE NETWORK TERMINAL

I. BACKGROUND OF THE INVENTION

1. Field of the Invention

The present invention refers, in general, to distribution enclosures for managing fiber optic cables in the deployment of fiber optic networks at subscriber premises, and, more particularly, to a retaining enclosure for above-ground fiber optic/cable network terminal.

2. Discussion of the Known Art

The distribution of fiber optic cables, at multiple-dwelling units and other premises, necessitates the use of distribution enclosures mounted on walls or other locations of the premises. Companies dealing with installation and service of this type of enclosures required the development of enclosures, provided with a fiber optic cable aperture entrance at the left of the bottom side of the enclosures. This aperture entrance is used to accommodate the insertion of a fiber optic cable provided by the network supplier. At least one exit aperture was required at the right of the bottom side of the enclosure. Throughout this exit aperture, several optic fibers intended for different subscribers are routed for connecting with fibers of the fiber optic cable provider.

A main shortcoming of the enclosures for fiber optic cables resides in their inadequacy of providing a reliable, fast attachable/detachable device for firmly holding and retaining a fiber optic cable during the assembling operations and, when the enclosure is in normal use. Attempts have been made to eliminate or at least to alleviate the aforementioned shortcoming. Thus, for example, in the catalog of Multilink Co. a RNI-1500 Enclosure is presented. To retain a fiber optic cable in that enclosure, use is made of a cable clamp. A shortcoming of this technical solution resides in the fact that a tool, such a dimensionally adequate screwdriver is always necessary and the degree of tightening is subjective. Thus, not enough tightening or excessive tightening can cause damages to a fiber optic cable.

Another example is the US Published Application 2015/0043883 of Barnes, J R. et al., with the title: "OPTICAL NETWORK CABLE BOX WITH PREFORMED CABLE PORTS AND BLOCKING GATE" and published on Feb. 12, 2015. It includes a gate located within the interior of a cable box cavity, the gate being movable between a first position in which it blocks a preformed opening and a second position in which the preformed opening is unblocked. The main purpose of the gate is to prevent unauthorized access into the cable box. The important disadvantage of this box is the lacking of a unit for retaining/securing a fiber optic cable in the interior of the box.

II. SUMMARY OF THE INVENTION

A first objective of the retaining enclosure for above-ground fiber optic/cable networks terminals, according to the present invention, is to provide a reliable, fast attachable/detachable device for firmly holding/securing a fiber optic cable during the assembling operations and while the enclosure is in normal use.

A second objective of the present invention is to devise a unit for retaining/securing a fiber optic cable in the interior of the enclosure, conceived to preempt an eventual damage of the fiber optic cable and to speed up and simplify basic operations/block and unblock.

A third objective of the present invention is to provide a compact enclosure enabled to accommodate therein various features for fiber optic and other cables and to be adaptable to be mounted in different positions.

Based on the above objectives, the inventors, after extensive consideration of the state of the art and tests of prototypes, developed an improved retaining enclosure for above-ground fiber optic/cable network terminal.

Broadly stating, the retaining enclosure for above-ground fiber optic/cable network terminal, according to the present invention, comprises an enclosure incorporating (a) a tray including a back base plate and (b) a hinged panel; a unit for retaining/securing a fiber optic cable, positioned in the interior of the enclosure and fastened to the back base plate. The unit includes a a base plate attached to the back base plate; a vertical slat projecting vertically, outwards from the back base plate and a ramification branching out as a limb of the vertical slat and parallel to the latter; the ramification starting from or near midway of the vertical slat; a pair of parallel, closely spaced ridges, wherein a first, which is closer to a front end of the ramification, juts out more prominently than the second; the ramification and a corresponding segment of the vertical slat are downwards connected by a cradle shape zone having internal, opposing internal surfaces striated; a first hollow cylindrical socket housing of relative small size, positioned proximate to a front end of the vertical slat and extending outward from the latter; the first hollow cylindrical socket housing being traversed longitudinally by an outside facing longitudinal opening; a shifting lever having a shape of an angled, cantilevered part with a longitudinal axis of symmetry generally bent at 90 degrees incorporates an initial zone formed by a pair of parallel spaced side slats succeeded by an adjoining finger actuating integral zone, the latter being provided with a depression for accommodating a fingertip; an oscillating pin, integral part of the shifting lever, is jointed transversely to the pair of parallel spaced side slats; an outline contour of each pair of the parallel spaced side slats comprises a nonoperational linear portion, succeeded by a first operational linear portion; between the nonoperational linear portion and the first operational linear portion a 90 degrees angle is formed; a second operational linear portion succeeding and so intersecting the first operational linear portion, that between the former and the latter an obtuse angle is formed; a second hollow cylindrical socket housing is disposed at an internal junction of the initial zone and the finger actuating integral zone; the second hollow cylindrical socket housing being traversed longitudinally by an outside facing slot; a unitary, quadrangular, bent frame, similar to a deflecting yoke, comprises a pair of fractured looking, parallel slats interconnected adjacently their longitudinal extremities by a first and a second transverse rods; for assembling the unit for retaining/securing a fiber optic cable, the shifting lever is mounted to the vertical slat by snapping the oscillating pin into the first hollow cylindrical socket housing; thus, a first predominant fulcrum is established; then, the first transverse rods of the unitary, quadrangular, bent frame is mounted to the shifting lever, hence a subservient fulcrum is established; a space between the vertical slat and the ramification being adapted to receive primarily, with a clearance, a relative small segment of a fiber optic cable with parallel lateral surfaces and a specific traverse size; a limited range of close to specific traverse size could be engaged as well; a chosen distance between the portion and an external (outward) face of the ramification, /when said first operational linear portion is abutting an outward face of the vertical slat/ and the second traverse rod is forced to lodge past the first of the closely spaced ridges, thus corresponding to a lower position of the finger actuating integral zone, when a segment of fiber optic cable is retained in the unit for retaining/securing a fiber optic cable.

More specifically, the tray of the unit for retaining/securing a fiber optic cable further incorporates a top and a bottom side, the latter being provided at each side of longitudinal axis of symmetry of the tray with an aperture resembling to a flat shovel having an upper rectangular shape continued by a circular sector; the aperture is so profiled as to engage alternatively a biting-retaining fixture or an exit grommet; the former being made of a rigid plastic, while the second—of a soft, elastic polymer, such as an elastomer; the biting-retaining fixture comprises a pair of identical, parallel, spaced captive plates, each of the latter having along its longitudinal axis of symmetry a slit starting from its bottom and ending somewhat close to an imaginary center of a circle to which the circular segment pertains; the slits of the captive plates are coincidental; the slit ends inward into an inverted U-shape portion, adapted for lodging a fiber optic cable routed from an exterior of the enclosure; a cutting blade shape margin starting from an outside periphery of said slit converges inwardly and has a dimension adapted to incise and, thus, bite and retain a segment of fiber optic cable, /without the danger of damaging the latter/; the cutting blade shape margin has a calibrated lateral size dimensionally corresponding to a specific fiber optic cable dimension and to a limited range of dimensionally close sizes; a wall disposed between the pair of identical, parallel spaced captive plates is retracted with respect to periphery of the latter which it distantly follows; a first channel extends above the upper portion and a second channel is formed between the wall and corresponding laterally adjacent portions of the pair of identical, parallel spaced captive plates; an exit grommet, similar in shape to the biting-retaining fixture is distinguished from the latter by the material from which it is made and by eliminating the slit; the exit aperture is pierced throughout the exit grommet to cut across the latter while still creating a seal against the environment.

III. BRIEF DESCRIPTION OF THE DRAWINGS

The subject matter of the instant invention is particularly pointed out and distinctively claimed for the concluding portion of the specification. The invention, however, both in structure and operation may be better understood by reference to the following description taken in conjunction with the subjoined claims and the accompanying drawings of which:

Figure 1:
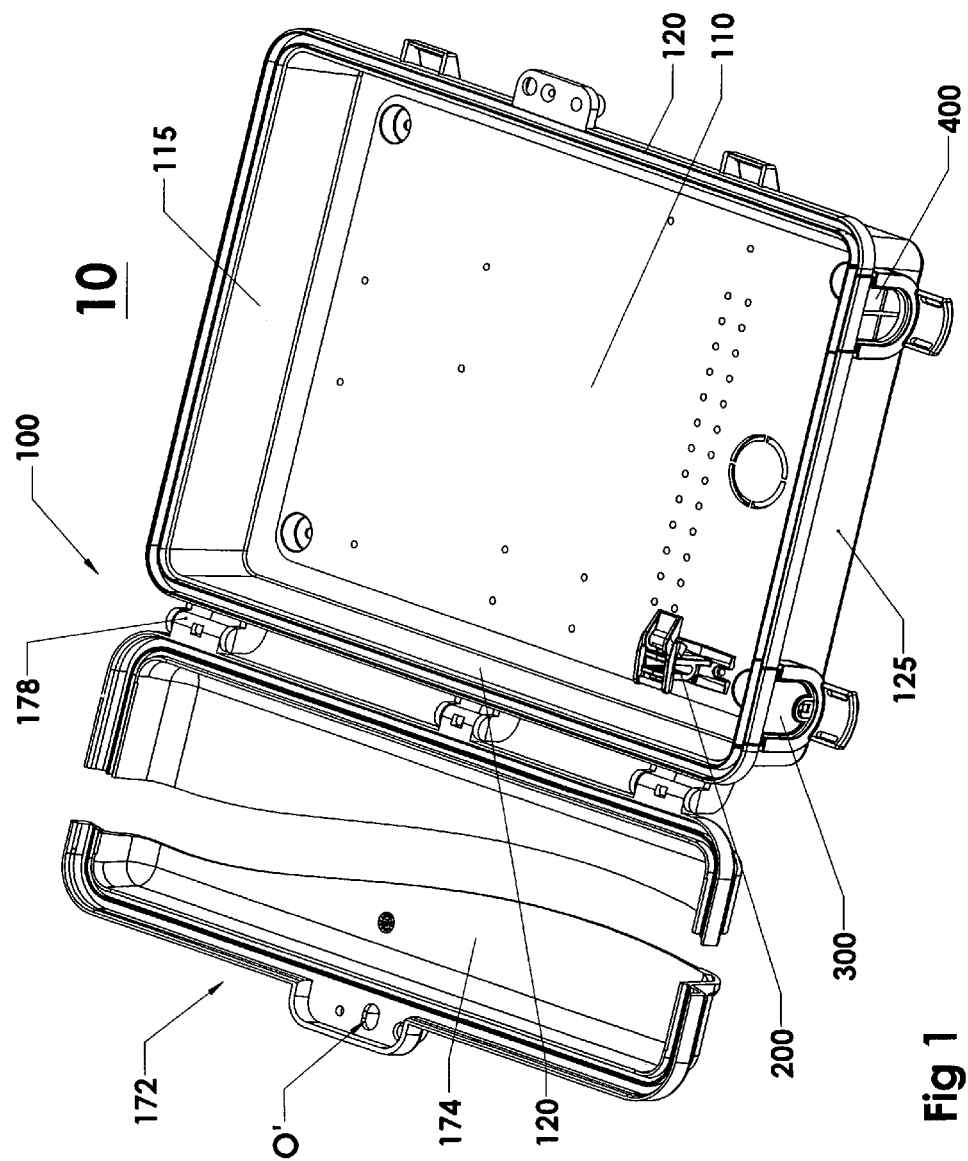
FIG. 1 is a perspective view of the enclosure assembly conform the present invention.
Figure 2:
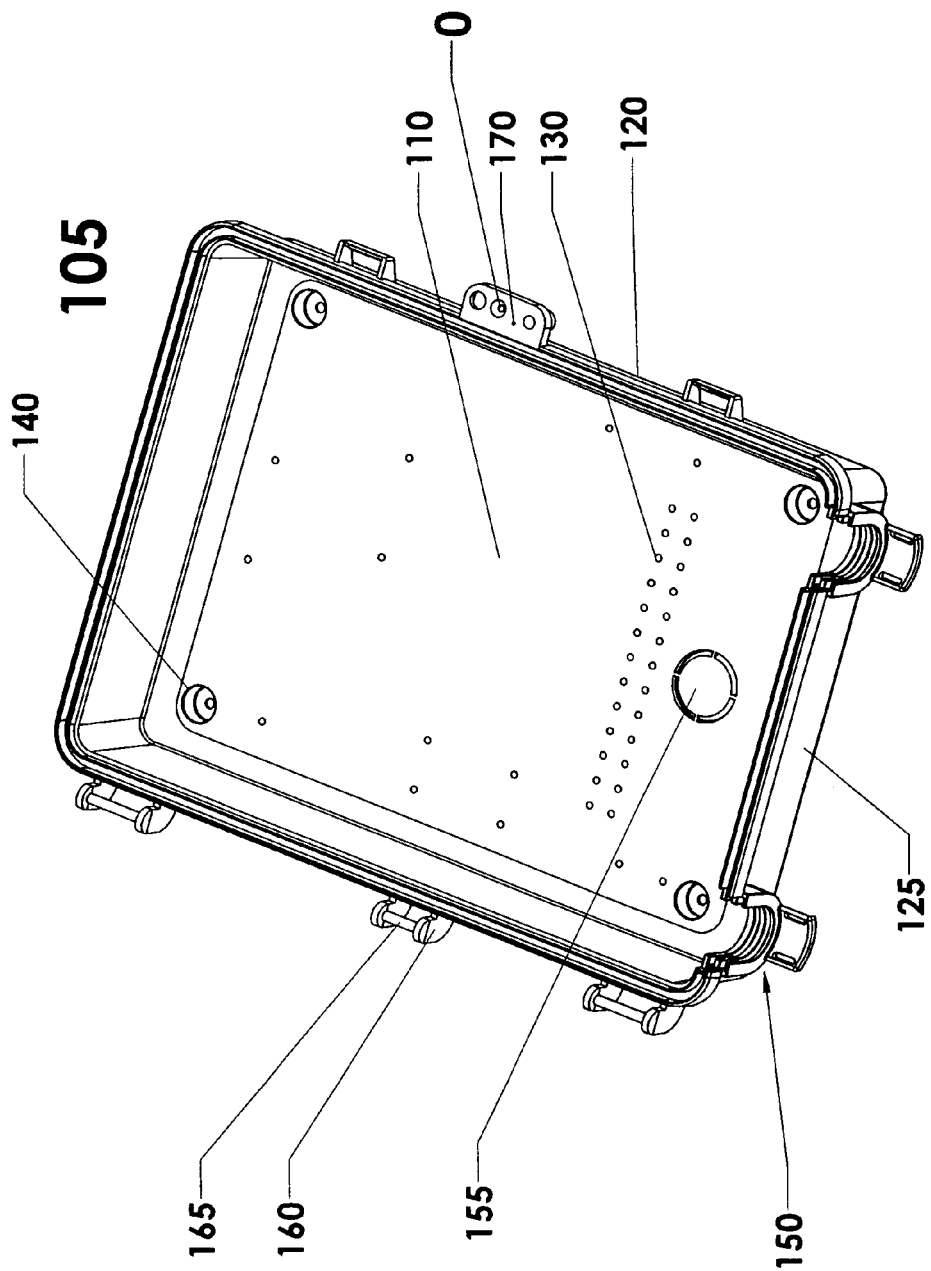
FIG. 2 is a perspective front view of the tray of FIG. 1, shown without the hinged panel subassembly.
Figure 3:
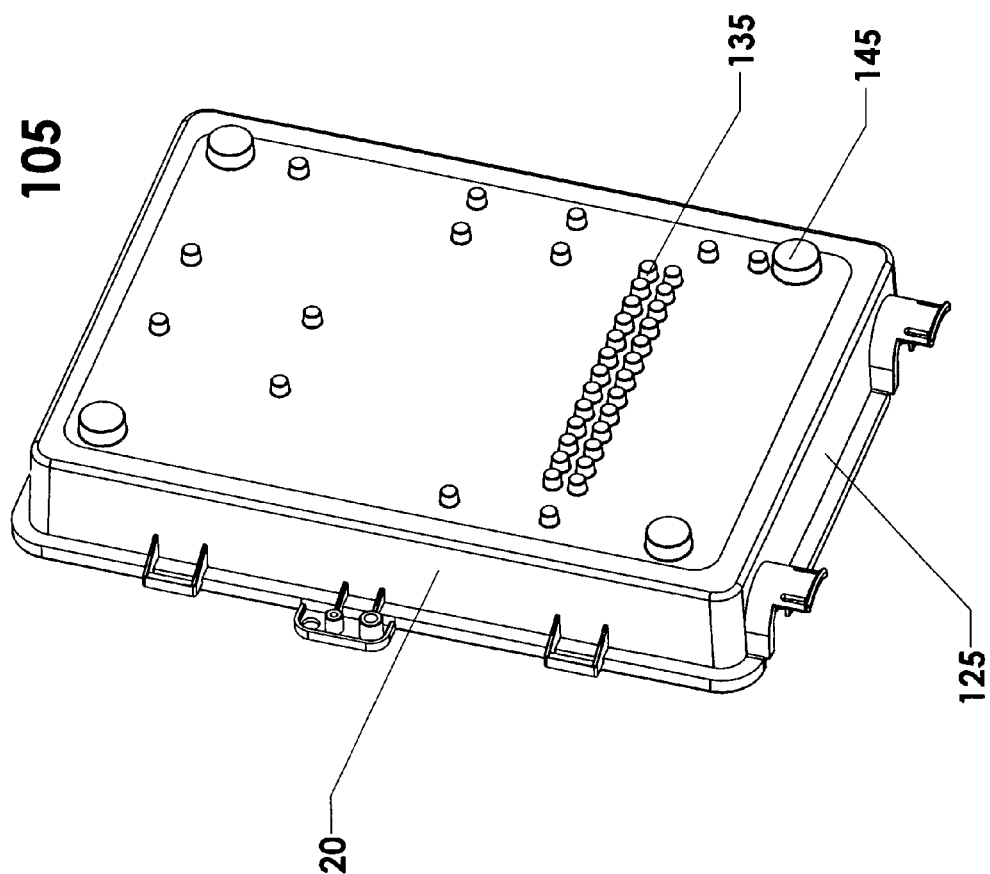
FIG. 3 is perspective back view of FIG. 2.
Figure 4:
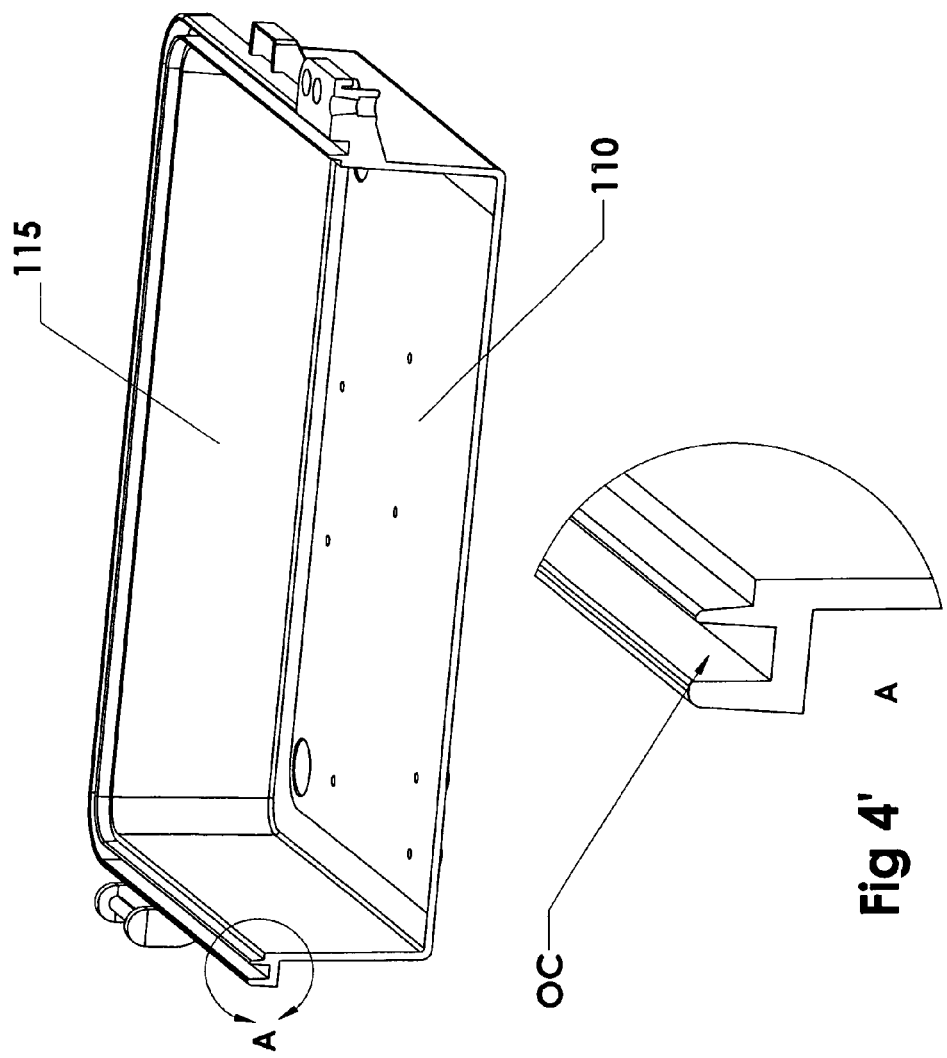
FIG. 4 is perspective front view of the tray shown with a rupture A.
Figure 5:
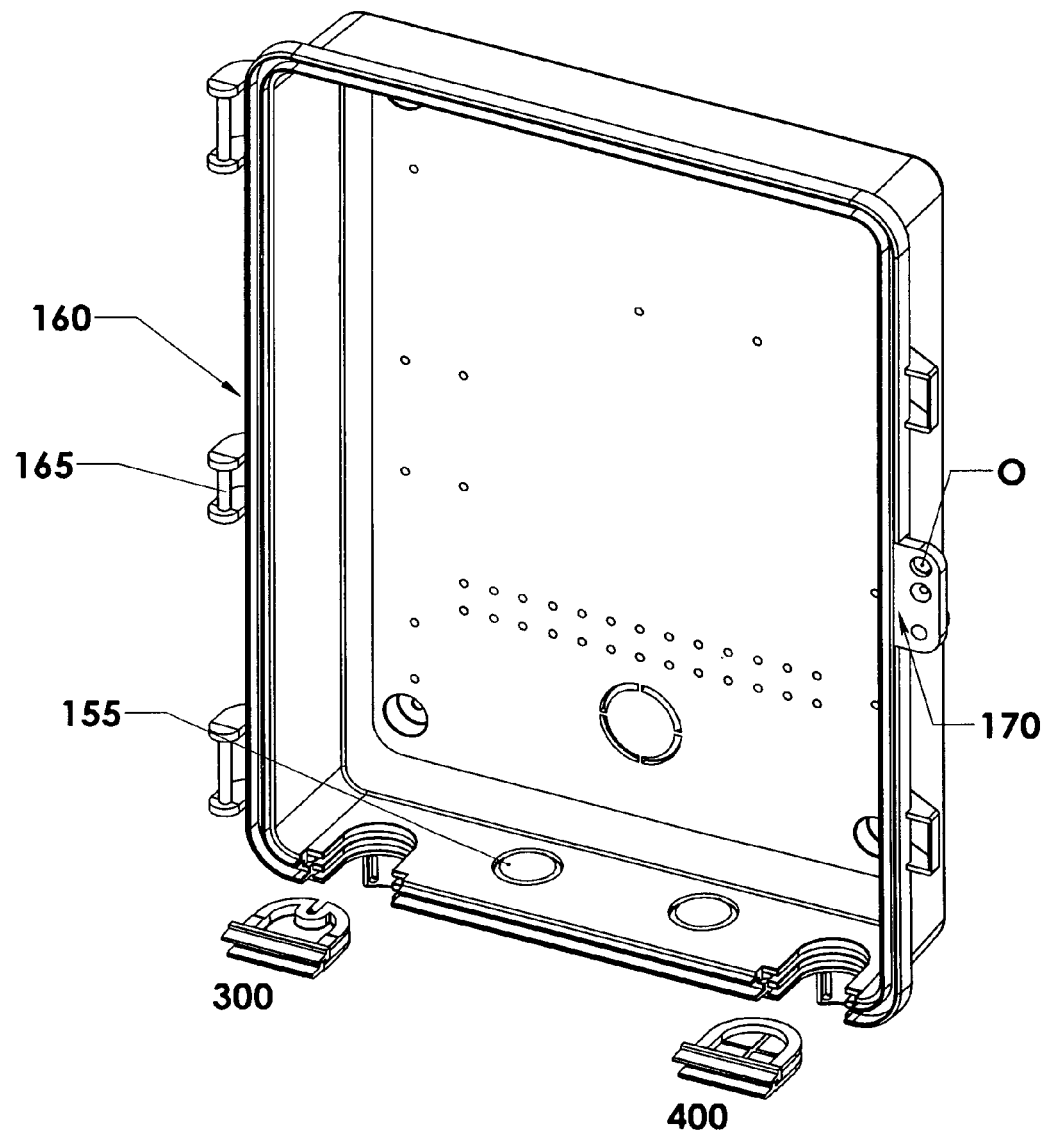
Figure 6:
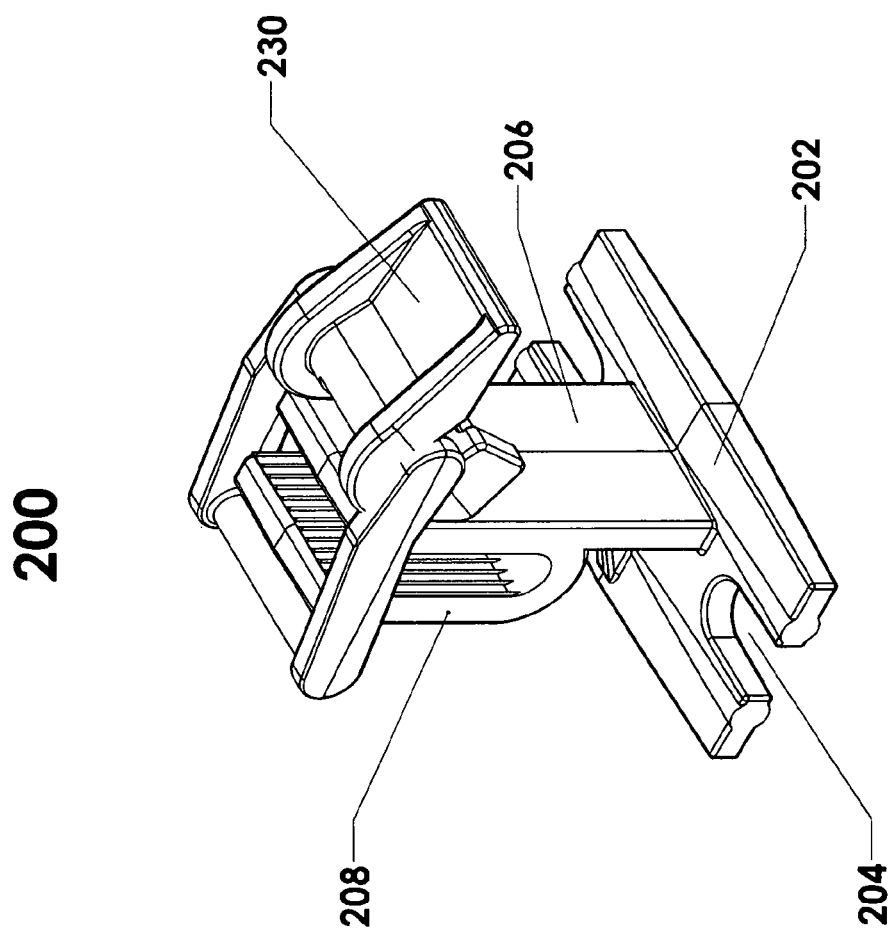
Figure 7:
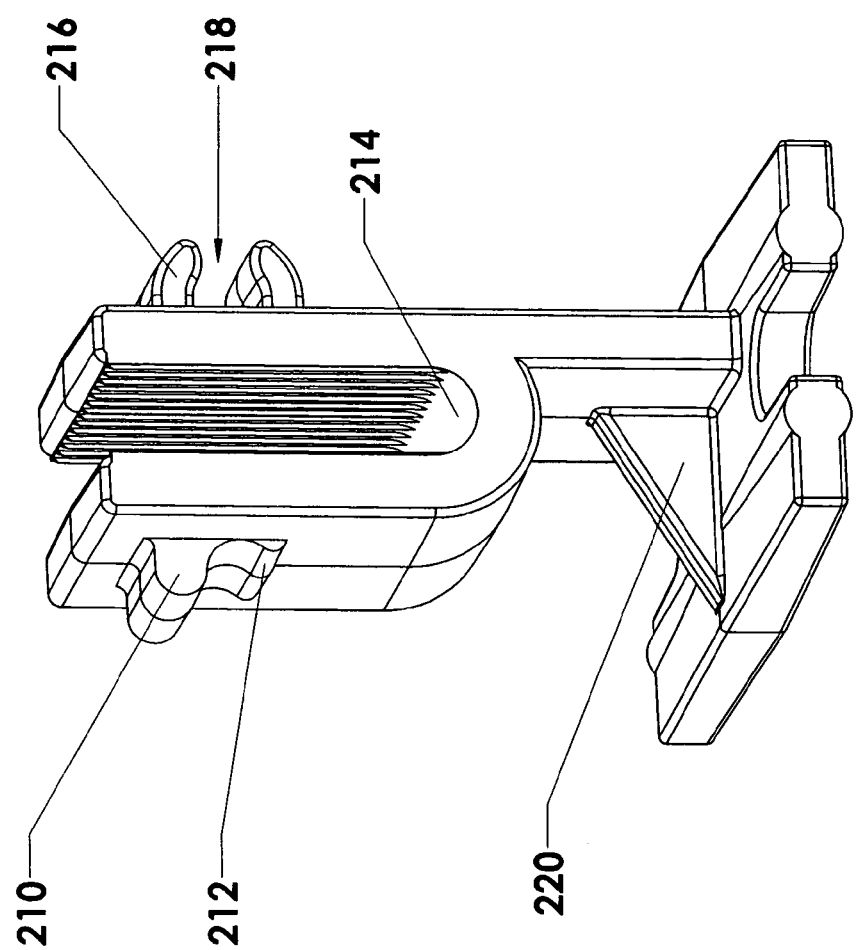
Figure 8:
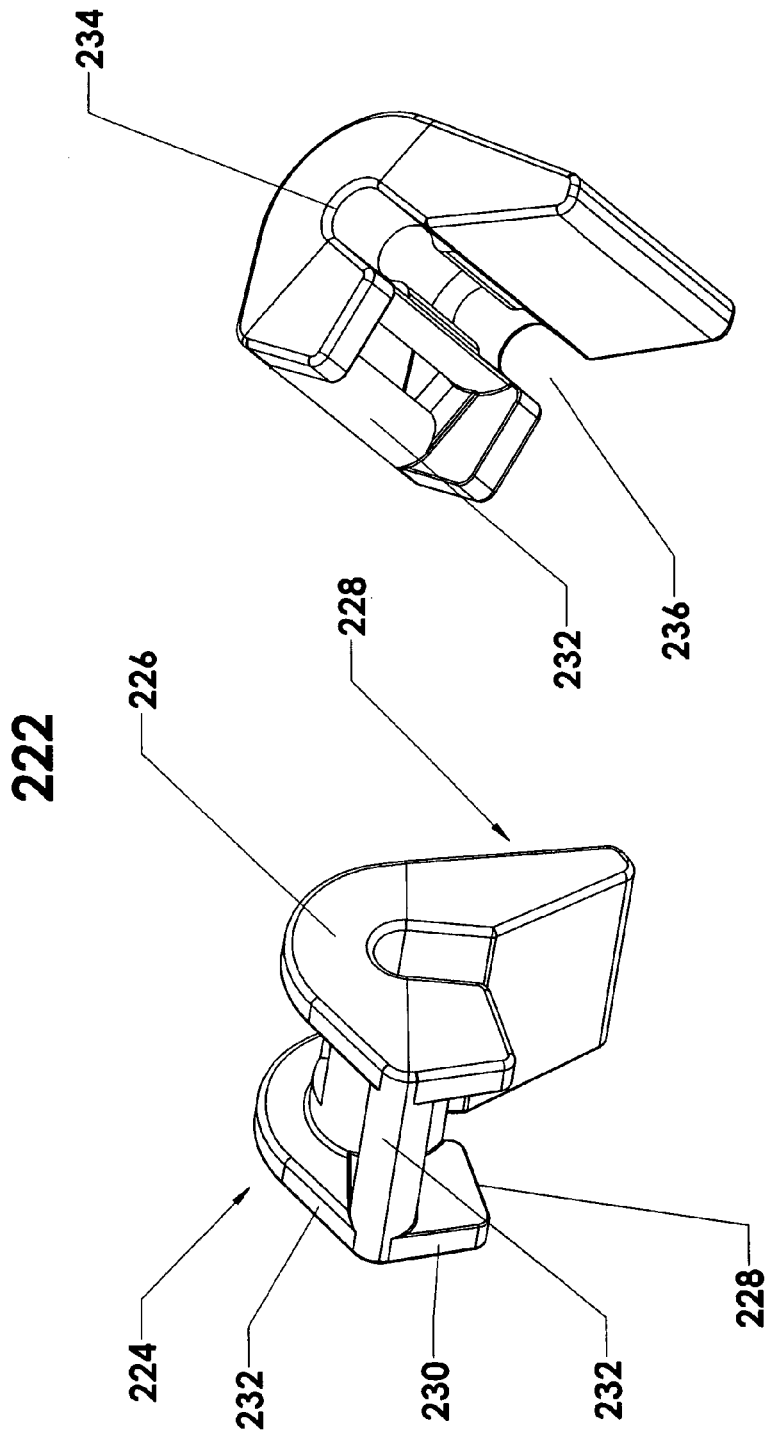
Figure 9:
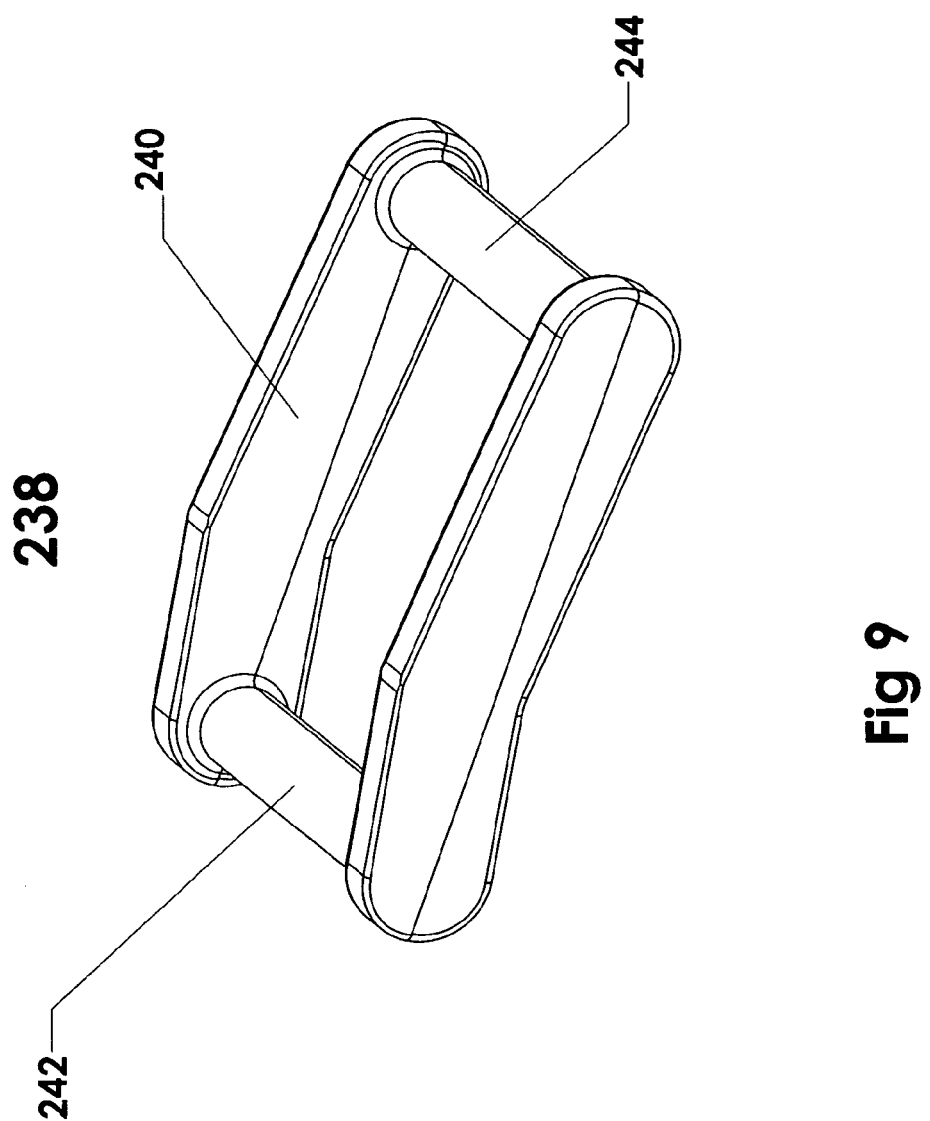
Figure 10:
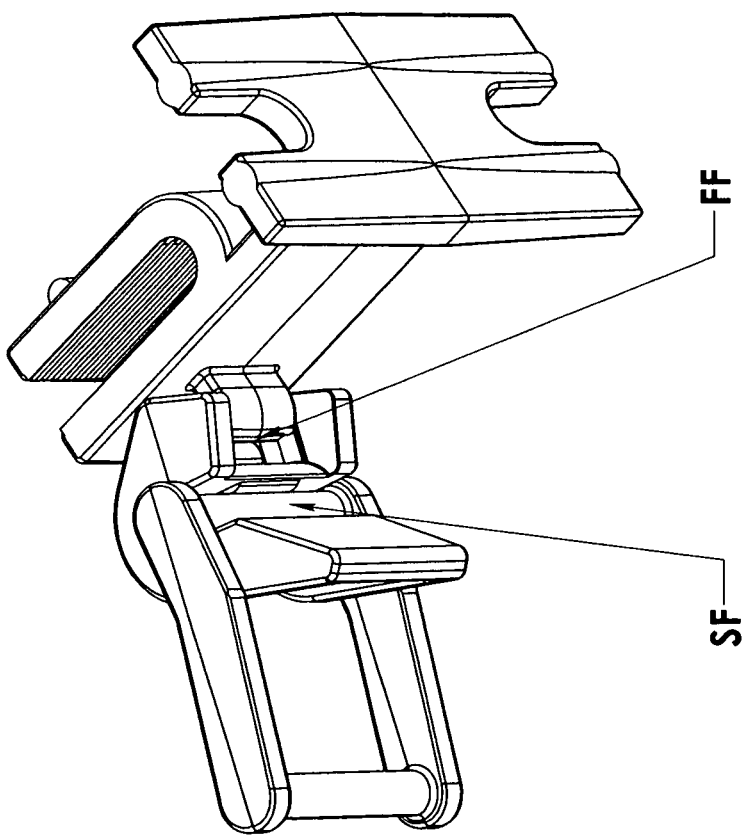

FIG. 4' is a rupture from FIG. 4;

FIG. 5 is a perspective front view of FIG. 3;

FIG. 6 is a perspective view of the unit for retaining/securing a segment of a fiber optical cable;

FIG. 7 is a retaining unit without shifting lever and unitary, quadrangular, bent frame;

FIG. 8 is a perspective lateral view of the shifting lever;

FIG. 8' is a perspective front view of the shifting lever;

FIG. 9 is a perspective view of the unitary, quadrangular, bent frame;

FIG. 10 is a perspective view of the unit before securing a fiber optic segment;

FIG. 11 is a front view of biting/retaining fixture;

FIG. 11' is a perspective view of FIG. 11; and

FIG. 11" is a lateral view of FIG. 11.

IV. DESCRIPTION OF THE PREFERRED EMBODIMENT

The accompanying drawings, as above described, depict a preferred embodiment of a retaining enclosure for above-ground fiber optic/cable network terminal, which is intended for use in single residences, multiple dwelling units or commercial premises. Reference numeral 10 was chosen for generally naming the preferred embodiment of the retaining enclosure for above—

The accompanying drawings, as above described, depict a preferred embodiment of a retaining enclosure for above-ground fiber optic/cable network terminal, which is intended for use in single residences, multiple dwelling units or commercial premises. Reference numeral 10 was chosen for generally naming the preferred embodiment of the retaining enclosure for above-ground fiber optic/cable network terminals. For simplification, throughout the present specification, the term retaining enclosure 10 will be further used.

As a caveat, it is to be agreed that terms, such as "upper", "lower", "top", "bottom", "front", "back", "vertical", "horizontal", "outward" and "inward" are conventionally employed in the present specification with reference to a working, usual position, wherein retaining enclosure 10 is attached to a vertical wall.

Generally stating, with reference to FIGS. 1 through 11", an embodiment of retaining enclosure 10 includes:

an enclosure 100, made of plastic, and comprising a tray 105 and a hinged panel 172;

a unit 200, adapted for retaining/securing a fiber optic cable, positioned in the interior of enclosure 100 and fastened to back base plate 105;

a biting-retaining fixture 300, positioned at an entrance of enclosure 100 and adapted for initially inserting through and, then, holding a fiber optic cable; and an exit grommet 400, positioned at a departure opening of enclosure 100 and adapted for passing through while still creating a seal, toward an exterior, a fiber optic or a coaxial cable. Describing now in detail, tray 105 constitutes a unitary structure that includes a back base plate 110, surrounded by a top side 115, lateral sides 120 and a bottom side 125.

Back base plate 110 incorporates a multiplicity of circular apertures 130, each of the latter coaxially extending from a rear surface of back base plate 110 into an integral cylinder 135 of a relatively larger diameter than all ones of multiplicity of circular apertures 130. The latter are intended for attaching via screws (not shown) various known devices, such as a reel for winding a reserve length of an optical fiber /slack storage device/, more adaptable to different distance locations of retaining enclosure 10, a fiber optic cable distribution/connection device, etc. Some of those devices are attached directly to back base plate 110, while sometimes, for adequately securing a particular device, use is made of intermediary fixtures (not shown), available on the Back base plate 110 incorporates, as well, in proximity of each of its corners, a circular indentation 140 having a diameter relatively larger than that of multiplicity of circular apertures 130 and integral cylinders 135. Each of circular indentations 140 extend coaxially from rear surface of back base plate 110 into a corresponding integral cylinder 145.

The latter has a relatively larger diameter than that of the coaxially, previously mentioned diameter. Circular indentations 140 together with corresponding integral cylinder's 145, via screws (not shown) constitute an optional solution for fasten tray 105, respective retaining enclosure 10 to a vertical wall.

Bottom side 125 incorporates, at each side of longitudinal axis of symmetry of tray 105, an aperture 150, resembling to a flat shovel having an upper rectangular shape continued by a circular sector, is so profiled as to engage biting-retaining fixture 300 or exit grommet 400. Top and bottom sides 115 and, respectively 125 are each provided, for future options, with a pair of ports 155, formed as feed-through circular knockouts.

Tray 105 further incorporates outwardly, along its upper periphery, a front facing overhung channel OC, which is rendered continuous by integrating a first channel FC (further disclosed) of biting-retaining fixture 300 and of exit grommet 400 (when the former and the latter are positioned in the lower traversal panel of tray 105).

Three double flange brackets 160, each of the latter being attached laterally by integral molding to an exterior of the right lateral side 120 and each including a dowel 165 for interconnecting the flanges of each double flange bracket 160. Dowels 165 are vertically positioned at the same level as front facing overhung channel OC.

An eyelet bracket 170 provided with an opening O, is centrally attached, also by integral molding to an exterior of left lateral side 120.

Hinged panel 172 is congruent with tray 105 and defined by a rectangular plate 174 having a margin 176 perpendicular to and encompassing the latter.

Three rounded hooks 178 are complementarily shaped as to engage the pair of double flange brackets 160, respectively dowels 165.

An opposing eyelet bracket 180 has an opening O' coincidentally corresponding with opening O of eyelet bracket 170. A screw (not shown) extending through openings O and O' is used to secure hinged panel 172 to tray 105.

Unit 200, adapted for retaining/securing a fiber optic cable, is positioned in the interior of enclosure 100 and includes a base plate 202 of rectangular shape. The latter is provided, starting from each of its extremities, by a slot 204 to be used with a screw (not shown) for securing unit 200 to back base plate 110.

A vertical slat 206 projects vertically, outwards from back base plate 110 and a ramification 208 branches out of vertical slat 206, as a limb, parallel to the latter. Ramification 208 starts from or near midway of vertical slat 206.

A pair of parallel, closely spaced ridges 210 and 212, wherein the first, which is closer to the front end of ramification 208, juts out more prominently than the second.

Ramification 208 and a corresponding segment of vertical slat 206 are downwards connected by a cradle shape zone 214.

Internal, opposing internal surfaces of ramification 208 and corresponding segment of vertical slat 206 are striated.

A first hollow cylindrical socket housing 216 of relative small size is positioned proximate to the front end of vertical slat 206 and extends outward from the latter. First hollow cylindrical socket housing 216 is traversed longitudinally by an outside facing longitudinal opening 218. A gusset plate 220, of triangular shape, connecting base plate 202 with a lower part of vertical slat 206 enhances the rigidity of unit 200.

A shifting lever 222, having a shape of an angled, cantilevered part with a longitudinal axis of symmetry bent generally at 90 degrees, incorporates an initial zone 224 formed by a pair of parallel spaced side slats 226 succeeded by a finger actuating integral zone 228. The latter is provided with a depression 230 for accommodating a fingertip. An oscillating pin 232, integral part of shifting lever 222 is jointed transversely to the pair of parallel spaced side slats 226.

An outline contour of each of the pair of parallel spaced side slats 226 comprises a nonoperational linear portion 228, succeeded by a first operational linear portion 230; between nonoperational linear portion 228 and first operational linear portion 230 there is a 90 degrees angle. A second operational linear portion 232 succeeds first operational linear portion 230; the former and the latter so intersect that an obtuse angle is formed between them. A second hollow cylindrical socket housing 234 is disposed at an internal junction of initial zone 224 and finger actuating integral zone 228. Second hollow cylindrical socket housing 234 is traversed longitudinally by an outside facing longitudinal slot 236.

A unitary, quadrangular, bent frame 238, similar to a deflecting yoke, comprises a pair of fractured looking, parallel slats 240, interconnected adjacently their longitudinal extremities by a first and a second transverse rods 242 and 244;

For assembling unit 200, firstly, shifting lever 222 is mounted to vertical slat 206, namely by snapping oscillating pin 232 into first hollow cylindrical socket housing 216. Thus, a first predominant fulcrum FF is established. Secondly, first transverse rods 242 of unitary, quadrangular, bent frame 238 is mounted to shifting lever 222 by snapping the former through outside facing longitudinal slot 236. Thus, a second subservient fulcrum SF is established.

A space between vertical slat 206 and ramification 208 is adapted to receive primarily, with a clearance, a relative small segment of a fiber optic cable with parallel lateral surfaces and a specific traverse size; a limited range of close to specific traverse size could be engaged as well.

A chosen distance between second operational linear portion 232 and an external face of ramification 208, /when second operational linear portion 232 abuts the outward face of vertical slat 206, /enables second traverse rod 244 to move freely, with a slack, with respect to outward of ramification 208. This corresponds to an upper, horizontal, top position of finger actuating integral zone 228.

Aforementioned chosen distance relatively bigger than another distance between first operational linear portion 230 and an external (outward) face of ramification 208, /when first operational linear portion 230 abuts the outward face of vertical slat 206/ and second traverse rod 244 is forced to lodge past first 210 of the pair of closely spaced ridges 210 and 212, between the first and the second. This corresponds to a lower position of finger actuating integral zone 228 when a segment of fiber optic cable is retained in unit 200. First of the pair of closely spaced ridges 210 and 212, being larger than the second, significantly limits or precludes a disengagement of rod 244 when a segment of fiber optic cable is retained in unit 200.

A biting-retaining fixture 300, as seen, for better understanding, from a top, when is flatly disposed on a horizontal plane, generally comprises an upper portion 302 having a rectangular shape which extends into a circular segment portion 304; biting-retaining fixture 300 resembles a flat shovel ending into a circular segment portion. Biting-retaining fixture 300 has a monolithic structure, made of rigid plastic material, and incorporates a pair of identical, parallel spaced captive plates 306.

Each captive plate 306 has along its longitudinal axis of symmetry (not shown) a slit 308 starting from its bottom and ending somewhat close to an imaginary center of a circle to which circular segment 304 belongs. The slits 308 of captive plates 306 are coincidental.

Slit 308 ends inward into an inverted U-shape portion 310, adapted for lodging a fiber optic cable routed from the exterior of the enclosure 100.

A cutting blade shape margin 312 starting from an outside periphery of slit 308 converges inwardly and has a dimension adapted to incise and, thus, bite and retain a segment of fiber optic cable, without the danger of damaging it. Blade shape margin 312 has a calibrated lateral size dimensionally corresponding to a specific fiber optic cable dimension and to a limited range of dimensionally close sizes.

A wall 314, disposed between the pair of identical, parallel spaced captive plates 306, is retracted with respect to periphery of the latter which it distantly follows.

A first channel FC extends above upper portion 302; a second channel SC is formed between wall 314 and corresponding laterally adjacent portions of the pair of identical, parallel spaced captive plates 306.

Biting-retaining fixture 300 is positioned, in the present embodiment, in the lower traversal panel of tray 105, at the left of longitudinal axis of symmetry (not shown) of tray 105.

An exit grommet 400, similar in shape to biting-retaining fixture 300, distinguishes from the latter by being made of a polymer, such as an elastomer, flexible, soft plastic material, such as an elastomer, and by eliminating slit 308. A corresponding exit aperture is pierced throughout exit grommet 400 to enable, for example, a fiber optic or a coaxial cable to cut across exit grommet 400 while still retaining a seal from the environment.

Exit grommet 400 is positioned in the lower traversal panel of tray 105, at the right of longitudinal axis of symmetry (not shown) of tray 105.

As required, a detailed embodiment of the present invention is disclosed herein; however, is to be understood that the disclosed embodiment is merely exemplary of the invention which may be embodied in various forms. Therefore, specific structural and functional details disclosed herein are not to be interpreted as limiting.

The embodiment of the invention in which an exclusive property or privilege is claimed is defined as follows:

1. A retaining enclosure for above-ground fiber optic/cable network terminals, comprising in combination:
   an enclosure incorporating (a) a tray incorporating a back base plate and (b) a hinged panel;
   a unit for retaining/securing a fiber optic cable, positioned in an interior of said enclosure and fastened to said back base plate, said unit including:
      a base plate to be attached to said back base plate;
      a vertical slat projecting vertically, outwards from said back base plate and a ramification branching out as a limb of said vertical slat and being parallel to the latter, said ramification starting from or near midway of said vertical slat;
      a pair of parallel, closely spaced ridges, wherein a first, which is closer to a front end of said ramification, juts out more prominently than the second; said ramification and a corresponding segment of said vertical slat are downwards connected by a cradle shaped zone; internal, opposing internal surfaces of said ramification and of a corresponding segment of said vertical;
      a first hollow cylindrical socket housing of relative small size, positioned proximate to a front end of said vertical slat and extending outward from the latter; said first hollow cylindrical socket housing being traversed longitudinally by an outside facing longitudinal opening;
      a shifting lever, having a shape of an angled, cantilevered part with a longitudinal axis of symmetry bent generally at 90 degrees and incorporating an initial zone formed by a pair of parallel spaced side slats succeeded by an adjoining finger actuating integral zone, the latter being provided with a depression for accommodating a fingertip;
   an oscillating pin, integral part of said shifting lever is jointed transversely to said pair of parallel spaced side slats;
   an outline contour of each of said pair of said parallel spaced side slats comprising a nonoperational linear portion, succeeded by a first operational linear portion; between said nonoperational linear portion and said first operational linear portion a 90 degrees angle being formed; a second operational linear portion succeeding and so intersecting said first operational linear portion, that between the former and the latter an obtuse angle is formed;
   a second hollow cylindrical socket housing disposed at an internal junction of said initial zone and said finger actuating integral zone; said second hollow cylindrical socket housing being traversed longitudinally by an outside facing slot;
   a unitary, quadrangular, bent frame, similar to a deflecting yoke, comprises a pair of fractured looking, parallel slats interconnected adjacently to their longitudinal extremities by a first and a second transverse rods;
   for assembling said unit for retaining/securing a fiber optic cable, said shifting lever is mounted to said vertical slat by snapping said oscillating pin into said first hollow cylindrical socket housing; thus, a first predominant fulcrum is established; then, said first transverse rods of said unitary, quadrangular, bent frame is mounted to said shifting lever, hence a subservient fulcrum being established;
   a space between said vertical slat and said ramification being adapted to receive primarily, with a clearance, a relative small segment of a fiber optic cable with parallel lateral surfaces and a specific traverse size; a limited range of close to specific traverse size could be engaged as well;
   a chosen distance between said second operational linear portion and an external face of said ramification, /when said second operational linear portion is abutting an outward face of said vertical slat/, is enabling said second traverse rod to move freely, with a slack, with respect to an outward of said ramification, thus corresponding to an upper, horizontal, top position of said finger actuating integral zone; and
   aforementioned chosen distance being relatively bigger than another distance between said first operational linear portion and an external (outward) face of said ramification, /when said first operational linear portion is abutting an outward face of said vertical slat/ and said second traverse rod being forced to lodge past said first of said closely spaced ridges, thus corresponding to a lower position of said finger actuating integral zone, when a segment of fiber optic cable is retained in said unit for retaining/securing a fiber optic cable.

2. The unit for retaining/securing a fiber optic cable, as defined in claim 1, wherein said tray further incorporates a top and a bottom side, the latter being provided at each side of longitudinal axis of symmetry of said tray with an aperture resembling to a flat shovel having an upper rectangular shape continued by a circular sector, said aperture being so profiled as to engage alternatively a biting-retaining fixture or an exit grommet; the former being made of a rigid plastic, while the second—of a soft, elastic polymer, such as an elastomer;

said biting-retaining fixture comprised of a pair of identical, parallel, spaced captive plates, each of the latter having along its longitudinal axis of symmetry a slit starting from its bottom and ending somewhat close to an imaginary center of a circle to which said circular segment pertains; said slits of said captive plates being coincidental;

said slit ending inward into an inverted U-shape portion, adapted for lodging a fiber optic cable routed from an exterior of said enclosure;

a cutting blade shape margin starting from an outside periphery of said slit converges inwardly and has a dimension adapted to incise and, thus, bite and retain a segment of fiber optic cable, without the danger of damaging the latter; said cutting blade shape margin having a calibrated lateral size dimensionally corresponding to a specific fiber optic cable dimension and to a limited range of dimensionally close sizes;

a wall disposed between said pair of identical, parallel spaced captive plates being retracted with respect to periphery of the latter which it distantly follows;

a first channel extending above said upper portion and a second channel being formed between said wall and corresponding laterally adjacent portions of said pair of identical, parallel spaced captive plates;

an exit grommet, similar in shape to said biting-retaining fixture is distinguishing from the latter by the material from which it is made and by eliminating said slit; the exit aperture being pierced throughout said exit grommet to cut across the latter without compromising the seal.

* * * * *